Dec. 23, 1930.  G. P. HEINER  1,785,903
PISTON
Filed March 18, 1929
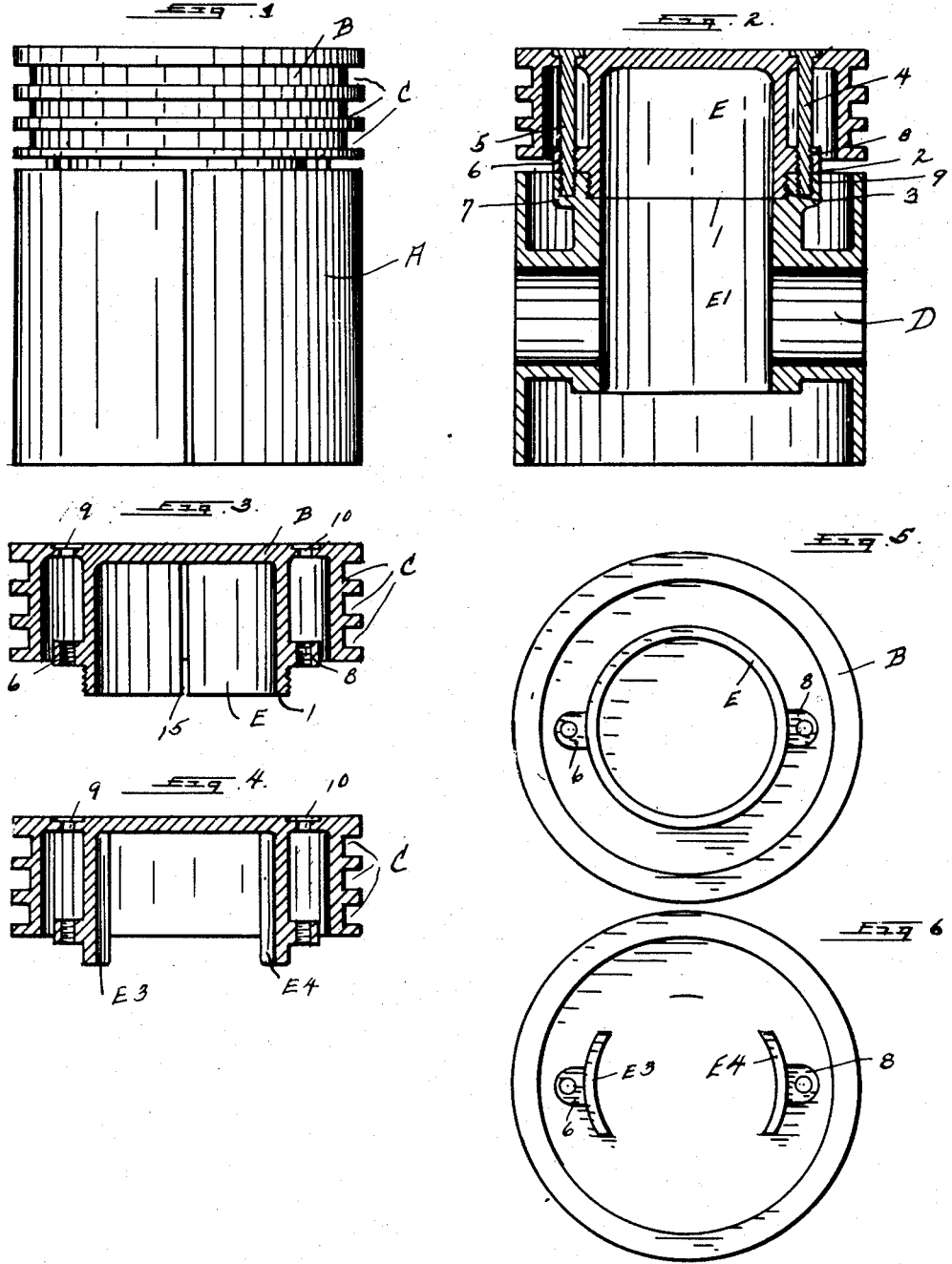
Inventor
Glen. P. Heiner
By R. M. Thomas.
Attorney Patented Dec. 23, 1930

1,785,903

UNITED STATES PATENT OFFICE

GLEN P. HEINER, OF SALT LAKE CITY, UTAH

PISTON

Application filed March 18, 1929. Serial No. 347,795.

My invention relates to automobile engines and more particularly to all types of engines in which a piston is used for the compression and power from explosion of gases or from the expansion of vapors.

A further object is to provide a new piston for internal combustion engines which will be removable from the connecting rod without the bearing of the connecting rod being removed from the crank shaft of the engine.

A still further object is to provide a piston which will have removable head thereon, said head being removed to disconnect the connecting rod from the wrist pin and the rest of the piston may then be removed from the cylinder. A new piston may then be fitted into the cylinder or merely new rings applied to the old piston and the piston again inserted.

These objects I accomplish with the device illustrated in the accompanying drawings in which similar numerals and letters of reference indicate like parts throughout the several views and as described in the specification forming a part of this application and pointed out in the appended claim.

In the drawings I have shown the best and most preferred manner of building my invention. Figure 1 is a side elevation of the piston. Figure 2 is a section diametrically and longitudinally through the piston. Figure 3 is a section of the removable head. Figure 4 is a section of a modified form of removable head. Figure 5 is an inverted plan view of the head shown in Figure 3. Figure 6 is an inverted plan view of Figure 4.

In the drawings I have shown the skirt of the piston as A, the removable head as B, the ring grooves as C and the wrist pin bearings as D. The removable head and the skirt are cylindrical in form and the removable head is closed on one end to form the piston head. Centrally on the bottom side of the piston head I form a smaller cylindrical member E which member E is provided with lugs 6 and 8 on the lower outer edges thereof, and the lower end of the said member E is threaded at 3. Within the said skirt A and formed integral with the inner ends of the wrist pin bearings D, I form another cylindrical member E1 of the same internal diameter as that of the cylinder E and adapted to have the threaded portion of the member E threaded into the upper end of the said cylinder E1. This joins the skirt A to the piston head B and makes an integral piston thereof with the face 1 of the piston skirt engaging with the face 2 of the head B. Lugs 7 and 9 are formed on the top end of the member E1 adapted to be brought into alignment with the lugs 6 and 8 and tap bolts 4 are then passed down through the top of the piston head B through the lugs 6 and 8 and into the lugs 7 and 9 securing the lugs together and insuring that the piston cannot be separated by the action of the motor. The heads of the said bolts are set into sockets 10 in the head of the piston. In Figure 3 of the drawings I have shown the cylindrical member E split at 15 to allow for expansion and contraction and in Figures 4 and 8, I have shown the cylindrical member with both sides removed leaving segments E3 and E4 as the means of securing the two pistons together, and I have also shown the lower end of the members E3 and E4 not threaded with only the bolts 4 to hold the piston head and the skirt together.

The operation of the device is as follows:

To remove the piston from the connecting rod the bolts 4 are removed from the lugs 6, 7, and 9 and the piston head then turned until the threaded portions are free. The head may then be removed so that the mechanic can get at the top of the connecting rod to disengage the rod from the wrist pin and when this is done the piston skirt A may then be removed.

To assemble the piston the skirt is placed in the cylinder, the wrist pin connected with the connecting rod and the head B may then be screwed into the skirt A and the bolts 4 placed to prevent them parting. When assembled together there is a cooling space between the lower edges of the head B and the upper edge of the skirt A.

Having thus described my invention I desire to secure by Letters Patent and claim.

In a removable head piston the combination of a cylindrical skirt having a centrally located vertically split cylindrical member formed therein; a piston head having a centrally located vertically split cylindrical member formed therein; threads on the engaging ends of the two cylindrical members; aligned lugs formed on the outer sides thereof; and bolts adapted to be passed through the top of the piston head and skirt together.

In testimony whereof I have affixed my signature.

GLEN P. HEINER.